June 15, 1943.   G. ZARBO   2,321,639
FUNNEL AND METHOD OF FILTERING
Filed Sept. 7, 1939

Inventor
George Zarbo,
by Charles B. Belknap
his Attorney

Patented June 15, 1943

2,321,639

UNITED STATES PATENT OFFICE 2,321,639

FUNNEL AND METHOD OF FILTERING

George Zarbo, Vineland, N. J., assignor to Kimble Glass Company, Vineland, N. J., a corporation of Illinois Application September 7, 1939, Serial No. 293,847

3 Claims. (Cl. 210—160)

The present invention relates to conical funnels of the type adapted to support filter paper and the method of supporting the filter paper in the funnel. More particularly the invention relates to a funnel having an angle of convergence less than that of a filter paper formed or folded to be supported in the funnel.

One of the common means of filtering a mixture of liquid and solid particles is to fold a round disc of filter paper twice along diametrical lines at right angles to each other and spread it to form a cone-shaped filter, this filter then being placed in a funnel, after which the liquid-solid mixture is poured into the supported filter. When a filter paper is thus folded, the angle of convergence is sixty degrees. It has been the practice to shape the inner surface of the funnel so that its angle of convergence is likewise sixty degrees. Hence the filter paper fits snugly within the funnel, and, except for a small portion at the apex, extending into the spout of the funnel, is in intimate contact with the inner surface of the funnel at all points. When the paper is wetted, it hugs the wall of the funnel tightly, thus retarding the passage of liquid through the paper and into the stem of the funnel.

Various ways of modifying funnels have been proposed to hasten the passage of liquid through filters. In the so-called "fluted" funnels longitudinal ribs and/or channels have been formed on and in the surface of the funnel for this purpose. These devices have the effect of increasing the speed of filtration, but are objectionable for two reasons: First, they add to the cost of the funnel; and secondly, when the irregularities in the surface are made sufficiently pronounced to have a marked effect on the speed of filtration, it is then found that the paper filter is insufficiently supported and the funnel can no longer be used with suction. With such a funnel, an attempt to use suction (with small platinum cone at apex of the funnel) results in rupture of the paper in the fluted area of the funnel.

It is one of the objects of the present invention to form a conical funnel, the angle of convergence of the inner surface of which is slightly less than sixty degrees.

It is also an object of this invention to use a funnel whose sides converge at less than sixty degrees in combination with the conventional paper cone having an angle of convergence of sixty degrees.

It is also an object of the invention to produce a funnel having a smooth inner surface, free from protuberances or channels, this inner surface supporting a substantial portion of a sixty-degree paper cone but leaving another substantial portion of the cone unsupported.

Other objects will be apparent from the following description of the invention taken in connection with the accompanying drawing, in which.

Figure 1:
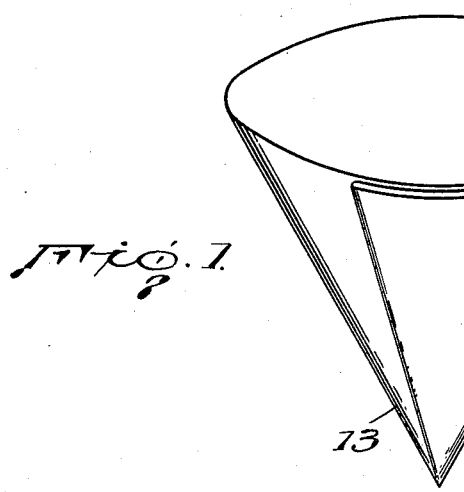
Fig. 1 is a perspective of a filter paper folded in a conventional manner.
Figure 2:
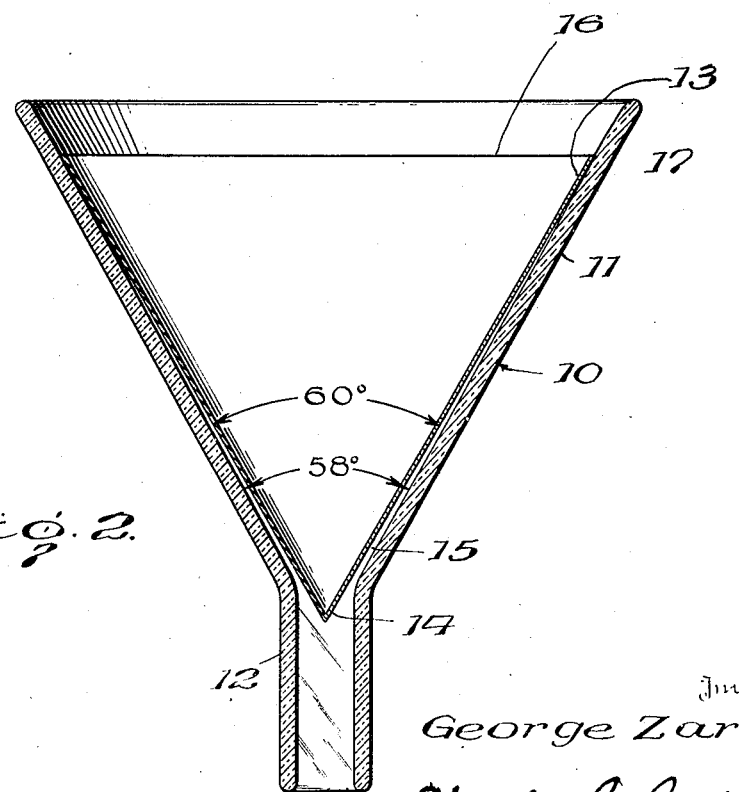
Fig. 2 is a sectional elevation of a preferred form of funnel illustrated as supporting a filter paper folded as in Fig. 1.

In the drawing, it will be seen that the funnel 10 comprises a conical body portion 11 and a stem 12 at the small end thereof. The filter paper 13 is folded in a conventional manner, that is, by first folding along a diametrical line and then doubling the first fold along a second diametrical line at right angles to the first fold. When spread, the folded paper takes the form of a hollow cone, the sides of which converge at an angle of sixty degrees. The cone-shaped filter is then placed in the funnel 10 as shown in Fig. 2 wherein it is supported. A liquid-solid mixture poured into the filter will be separated into its solid and liquid phases, the solid phase remaining in the filter while the liquid phase passes through the paper and is discharged through the spout 12.

At the present time all funnels made for laboratory use and intended to support filter papers folded in the conventional manner herein referred to, have an angle of convergence of sixty degrees, the same as that of the filter. It will be obvious, assuming the inner surface of the funnel to be smooth, that all of the filter, except the tip or apex 14, lies snugly against the funnel wall.

As illustrated in Fig. 2, the folded filter converges at an angle of sixty degrees. The present funnel, however, has an angle of convergence slightly less than sixty degrees. In the drawing this angle is shown as fifty-eight degrees, although it might be slightly more or less. By thus supporting the filter in the funnel, it is apparent that that portion of the filter adjacent the apex end of the cone will be spaced, as at 15, from the wall of the funnel for a substantial distance above the apex, this spacing gradually diminishing toward the mouth end 16 of the filter. The portion nearest the mouth end of the filter will, of course, lie closely against the wall of the funnel, as indicated at 17. It has been found in tests that the rate of filtration in filters thus supported in a funnel is markedly increased. As examples of actual tests made, the following tables are illustrative of the rate of filtering with fluted funnels, plain sixty degree funnels and plain fifty-eight degree funnels.

*Filtration time using 110 m/m Whatman #40 paper*

| Test | Precipitate | Funnel | Total time required for filtration |
|---|---|---|---|
| | | | Minutes |
| 1 | Barium sulphate | Fluted A | 20.6 |
| | | Fluted B | 23.4 |
| | | Plain 60° | 45.5 |
| | | Plain 58° | 11.5 |
| 2 | Calcium oxalate | Fluted A | 96.7 |
| | | Fluted B | 84.2 |
| | | Plain 60° | 107.4 |
| | | Plain 58° | 66.3 |
| 3 | Aluminum hydroxide | Fluted A | 12.3 |
| | | Fluted B | 9.9 |
| | | Plain 60° | 38.2 |
| | | Plain 58° | 13.2 |

It will, therefore, be seen that, with one exception, the fifty-eight degree funnel permits more rapid filtering than the fluted funnels and in all three cases the dispersion is filtered at a much more rapid rate in the fifty-eight degree funnel than is the case where a sixty degree plain funnel is employed.

While the filter has a slight tendency to sag at its unsupported portions, it is not subjected to abrupt stretching as is the case when flutes or channels are used. Furthermore, the plain, smooth surface of the funnel is more readily cleaned than is a fluted funnel. Even with sagging the paper may have light contact with the wall of the funnel, but it will rest at the points of contact with relatively little pressure against the wall so that liquid will readily pass through the filter.

While a preferred angle of convergence, viz., fifty-eight degrees, has been designated as being effective, this angularity may vary slightly without changing the effectiveness of the filter provided, of course, the angularity of the funnel is less than sixty degrees. It is, therefore, intended that the angularity referred to be understood as being approximate.

Having described my invention as new, what I claim and desire to secure by Letters Patent is:

1. A funnel having a cone-shaped body portion having a discharge opening at its apex and a wide mouth, the inner surface of the funnel converging toward said discharge opening, the angle of convergence being substantially fifty-eight degrees.

2. In combination, a funnel having a cone-shaped body portion having a discharge opening at its apex and a wide mouth, the inner surface of the funnel converging toward said discharge opening, the angle of convergence being substantially fifty-eight degrees, and a cone-shaped filter element supported in said funnel, the angle of convergence of the sides of the filter being sixty degrees.

3. A funnel having a cone-shaped body portion having a discharge opening at its apex and a wide mouth, the inner surface of the funnel converging toward said discharge opening, the angle of convergence being substantially fifty-eight degrees, said inner surface being wholly smooth.

GEORGE ZARBO.